Patented Sept. 25, 1945

2,385,562

UNITED STATES PATENT OFFICE 2,385,562

STENCIL

Alexander Baczewski, New York, N. Y.

No Drawing. Application November 14, 1940,
Serial No. 365,696

1 Claim. (Cl. 101—128.2)

The present invention is an improvement in the art of stencil printing particularly applicable to the printing of textiles, which allows the use of dye pastes containing dyestuffs and containing alkalies or acids, with or without mordants, namely pastes which are corrosive, and accordingly which could not heretofore be used in this kind of textile printing.

It is well known in the art of printing, including textile printing, to use a fine silk screen as the base of the stencil. There is laid upon this fine silk fabric, a thin sheet of waxed paper or sometimes a film of Cellophane or a film of shellac, mounted on a sheet of strong paper such as kraft paper. The waxed paper, Cellophane or shellac film is next to the silk screen. The letters or figures or designs to be printed have previously been cut out from the said waxed paper or film or they can be cut out after the waxed paper or film has been suitably glued or cemented upon the said strong paper sheet. Thereafter the stencil is pressed, and the sheet of paper then thoroughly moistened and is then removed and discarded. The fine silk fabric is of course mounted upon a suitable frame, while the silk fabric is under sufficient tension to remain smooth.

Thereafter the said stencil is used with various printing inks, or pastes, some of which contain dyes. Heretofore it has not been possible to use such stencils with inks or dye-pastes containing acids or alkalies or mordanting substances, e. g. metal salts, because these substances are highly corrosive and would rapidly destroy the stencil.

In accordance with the present invention, the waxed paper or Cellophane or shellac film, referred to above is substituted by a film, preferably of a translucent character, which is made of one of the compositions described below, and which compositions are completely resistant to the acids, alkalies and mordants commonly used in dyeing.

In this manner the stencil is rendered completely resistant to such corrosive inks, and such inks can accordingly be used for stencil printing, including printing on textile fabrics.

The films may have, as their base, any one of the three following: (a) special types of vinyl resins, (b) ethyl cellulose and (c) rubber-chlorine compounds.

(a) These vinyl resins in order to have the desired resistance and other properties, should be made by copolymerizing a mixture of vinyl acetate and vinyl chloride, i. e. an inorganic acid ester and an organic acid ester of vinyl alcohol. The degree of polymerization should be such as to give resins having the desired resistance to acids, alkalies and mordants. Suitably 30% of vinyl chloride and 70% of vinyl acetate can be used for the copolymerization step. These resins are soluble in ketones, esters (e. g. ethyl acetate, etc.) chlorinated aliphatic hydrocarbons. They are insoluble in hydrocarbons and in alcohols. The molecular weight of these resins is unknown and probably variable. They melt only at high temperatures at which decomposition also occurs. Such products as V Y H F, sold by Carbide and Carbon Chemicals Corporation, are suitable examples of such bodies.

As examples of films made from vinyl resins, I give the following examples:

Example 1

| | Parts |
|---|---|
| Copolymer resin (as above) | 80 |
| Dibutyl phthalate | 20 |

The films (Examples 1, 2 or 3) can be made by applying a solution, preferably of 20% strength, of the said vinyl resin, in ethyl methyl ketone, upon a rotating smooth drum, in a drying atmosphere.

Example 2

| | Parts |
|---|---|
| Copolymer resin (as above) | 80 |
| Di-amyl phthalate | 20 |

Example 3

| | Parts |
|---|---|
| Copolymer resin (as above) | 80 |
| Di-butyl sebacate | 15 |
| Stearic acid | 5 |

(b) Cellulose ethers which are resistant to water, acids and alkalies, e. g. ethyl ethers of cellulose, of high ethoxy content, preferably about 46 to 49% ethoxy radical, and other similar cellulose ethers can be used. These ethers are wholly resistant to water, acids, alkalies and mordants. Such ethers containing 46% or more of ethoxy radical are well known to be very resistant to water and to caustic alkali solutions.

Example 4

| | Parts |
|---|---|
| Ethyl cellulose | 80 |
| Dibutyl phthalate | 20 |

Example 5

| | Parts |
|---|---|
| Ethyl cellulose | 80 |
| Methyl phthalyl ethyl glycollate | 20 |

Example 6

| | Parts |
|---|---|
| Ethyl cellulose | 80 |
| Cyclohexyl paratoluene sulfonamide | 20 |

The compositions (of Examples 4, 5 or 6) can be milled together under moderate heat (say 60 to 80° C.) in a kneading machine, and then worked into thin sheets or film, on a calendering machine.

(c) Rubber-chlorine compounds may be employed, together with blending and softening agents. In the following, I give three rubber chlorine compounds d, e, f, and three softening and plasticizing bodies g, h, i, which may be used therewith.

(d) Chlorinated rubber 50–75% Cl.
(e) Rubber hydrochloride 28–35% Cl.
(f) Chlorinated rubber hydrochloride 30–62% Cl.
(g) Butyl phthalyl butyl glycollate.
(h) Polymerized chlorinated biphenyl (melting point preferably 60° C.).
(i) Hydrogenated or not hydrogenated esters of abietic acid.

With the six bodies here stated, I give examples 7 to 15 inclusive, showing various mixtures which may be employed.

| | Examples | | | | | | | | |
|---|---|---|---|---|---|---|---|---|---|
| | 7 | 8 | 9 | 10 | 11 | 12 | 13 | 14 | 15 |
| d | 85 | | | 85 | | | 85 | | |
| e | | 85 | | | 85 | | | 85 | |
| f | | | 85 | | | 85 | | | 85 |
| g | 15 | 15 | 15 | | | | | | |
| h | | | | 15 | 15 | 15 | | | |
| i | | | | | | | 15 | 15 | 15 |

These compositions can be worked into films or thin sheets, as under Examples 4, 5 and 6.

In the above examples, 1 to 15, specific proportions are mentioned, but while these proportions are very suitable, I do not restrict the present invention to these proportions.

I desire to point out that with all of the above compositions, soft cumarone resin (which is a thick viscous liquid at room temperature), may be employed. Other water-insoluble resins which are resistant to alkalies and acids and mordants may also be employed.

For attaching the films to the paper backing, I preferably employ a rubber cement, and as the backing paper I preferably use glassine paper, but I do not restrict the invention to these particular details.

The film may be caused to adhere to the silk screen, by the use of heat sufficient to soften the same, or by the use of a small amount of a solvent, after which the film and paper backing are pressed upon the silk screen, then dried if necessary by heat, after which the glassine paper can be removed and discarded. For preparing a suitable stencil, a sheet of glassine paper is first laid on a hard surface. Over this the silk screen is stretched, e. g. carried upon a suitable rigid frame. Then the film (made according to one or another of the compositions described above, and if desired after having perforations made therein, to allow the passage of the dye paste) is cemented upon a sheet of kraft paper, and this structure is then placed upon the silk screen, the film-side toward the screen. The structure consisting of the silk screen, film and kraft paper, is then inverted and placed on a hard surface. Then a rag wetted with acetone is rubbed upon the silk screen, the acetone penetrating the screen causing the film to adhere thereto, and the pressure of the hand assisting in this. The acetone evaporates in a few minutes. The kraft paper is well wetted, and this paper peeled off. The stencil is then ready for use.

If desired, the film, stuck to the kraft paper, can be sold to the customer, who will make his stencil as follows. He first cuts out and removes from the film, the desired pattern to be printed. (In doing this he may cut out the contigous parts of the kraft paper or not.) Then the paper carrying the cut film is placed on a hard smooth surface, film side up. The silk screen (for example already stretched tightly upon a frame), is then placed over the film and kraft sheet. The silk screen is then rubbed gently but firmly with a rag wetted with acetone, which acetone penetrates the silk screen sufficiently to soften the remaining part of the film, to cause strong adhesion of the film to the silk screen. Then the acetone is allowed to evaporate from the silk screen and film, by allowing the structure to rest for a few minutes, preferably while still lying quietly on the said hard smooth surface. Then the structure is inverted and the kraft paper sheet is then thoroughly moistened, after which this paper sheet is then peeled off and discarded. The stencil is then ready for use in printing.

In this modification, the structure for the manufacturer to sell to the trade would be the film glued or attached, over its entire area, to one side of a sheet of kraft or similar paper, with a glue or cement which is non-resistant to water.

Alternatively, the adhesion can be produced by heat. For this purpose, the assemblage of glassine paper, silk screen, film and kraft paper, can be pressed with a warm flatiron, which may be at about 100–125° C. This causes the film to soften sufficiently to become thereby rigidly attached to the silk screen. Then the kraft paper is well moistened and removed.

I have here referred to kraft paper for carrying the film with cut out portions. Any other kind of relatively strong paper can be used.

I claim:

An intermediate product suitable for use in the production of a printing stencil adapted for use with dye pastes containing strongly corrosive chemicals, which comprises a fine textile fabric screen carrying rigidly attached thereto a film of material having as its major component, a vinyl-halide-vinyl-acetate copolymer, such film being mounted upon a removable backing sheet and such film having cut-out portions forming a pattern.

ALEXANDER BACZEWSKI.